United States Patent [19]

Hagshenas

[11] Patent Number: 5,350,281
[45] Date of Patent: Sep. 27, 1994

[54] FAN WITH SECONDARY AIR PASSAGE FOR MOTOR COOLING

[75] Inventor: Behzad Hagshenas, San Diego, Calif.

[73] Assignee: Sundstrand Corporation, Rockford, Ill.

[21] Appl. No.: 9,187

[22] Filed: Jan. 26, 1993

[51] Int. Cl.⁵ ............................................. F04B 39/06
[52] U.S. Cl. .................................. 417/371; 417/369; 417/423.8; 415/144
[58] Field of Search .............. 417/371, 366, 369, 423.8; 415/144, 169.1

[56] References Cited

U.S. PATENT DOCUMENTS

| | | | |
|---|---|---|---|
| 1,476,776 | 12/1923 | Stamm | 417/366 |
| 2,091,537 | 8/1937 | Wahlborg | 417/366 |
| 2,321,126 | 6/1943 | Brever | 417/371 |
| 2,394,517 | 2/1946 | Ingalls | 417/369 |
| 2,422,860 | 6/1947 | Seyfried | 417/366 |
| 2,658,665 | 11/1953 | Tschudy | 417/366 |
| 2,704,516 | 3/1955 | Mock | 417/366 |
| 2,715,367 | 8/1955 | Kodet et al. | 417/366 |
| 2,968,249 | 1/1961 | Caine et al. | 417/369 |
| 3,341,113 | 9/1967 | Sebok et al. | 417/369 |
| 4,767,285 | 8/1988 | Jyoraku et al. | 417/366 |
| 4,878,805 | 11/1989 | Hagshenas | 415/169.1 |
| 4,955,785 | 10/1990 | Cohen | 415/26 |
| 5,110,266 | 5/1992 | Toyoshima et al. | 417/366 |

*Primary Examiner*—Richard A. Bertsch
*Assistant Examiner*—Peter Korytnyk
*Attorney, Agent, or Firm*—Lawrence E. Crowe

[57] ABSTRACT

A motor driven fan capable of operating continuously in a dead-headed mode resulting from complete blockage of airflow from an outlet of the fan is provided. The fan includes a housing defining both a primary passage for directing a flow of air from an inlet to an outlet of the fan, and a secondary passage for directing a flow of air between the inlet of the fan and ambient air surrounding the housing opposite the primary passage. The secondary passage includes a motor compartment having an inlet passage in fluid communication with the primary passage and an outlet passage in fluid communication with the ambient air surrounding the housing. Impeller means, mounted within the housing, provide the flows of air in the primary and secondary passages. A motor, mounted within the motor compartment and operatively connected to drive the impeller means is continuously cooled by the flow of air through the secondary passage even when the flow of air through the primary passage is reduced to zero by a complete blockage of the outlet of the fan.

16 Claims, 1 Drawing Sheet

— ΔP WITHOUT SECONDARY PASSAGE
--- ΔP WITH SECONDARY PASSAGE
-- SYSTEM RESISTANCE
--- POWER

FAN WITH SECONDARY AIR PASSAGE FOR MOTOR COOLING

FIELD OF INVENTION

This invention relates to fans for propelling air along a flowpath, and more particularly to a motor driven fan capable of continuous operation with a complete blockage of the flowpath.

BACKGROUND OF INVENTION

In a motor driven fan of typical construction having a motor operatively connected to drive an impeller within a housing which defines a passage for directing a flow of air generated by the impeller, it is common practice to mount the motor within the passage so that the motor may be cooled by the flow of air through the passage. While this approach is simple to incorporate and has proven to be quite acceptable for providing motor cooling in a majority of applications, it has proven inadequate and may result in motor damage due to overheating in those applications where the fan must be operated continuously for extended periods with the flow of air severely restricted or entirely blocked.

One well known example of such an application is a gasper vent system which has been utilized for many years in aircraft to provide a source of ventilation for passengers in the form of an air jet issuing from small individually adjustable air nozzles, commonly known as "gasper vents", positioned above each passenger seat, which may be adjusted by each passenger according to his or her personal whim to restrict or to entirely block the air stream. Such a system typically includes a fan, commonly called a gasper boost fan, positioned in a flowpath defined by a duct configured to supply air to a large number of such gasper vents.

Since the amount of air required may vary considerably due to restriction and blockage of the individual air jets supplied by the duct, and since it is desirable to avoid annoyance to the passengers caused by either a lack of sufficient airflow or the need for continually readjusting his or her individual gasper vent, gasper boost fans must typically supply airflow at a relatively constant pressure over a wide range of flow rates. In addition, since it is desirable that the system supply air essentially instantaneously when the passenger opens a vent, it is generally a requirement of such systems that the gasper boost fan run continuously, even when all of the gasper vents are fully closed.

One approach utilized in prior gasper vent systems to ensure a flow of air for motor cooling during extended periods of operation with all gasper vents blocked has been the inclusion of an air recirculation duct either integral with or external to the gasper boost fan to allow means for air to recirculate from the outlet to the inlet of the fan due to the pressure rise across the impeller. While this approach has been utilized for reasonably extended periods of operation with all gasper vents blocked, the length of time is limited by the fact that, once the system is blocked, no new air enters the system, and eventually the temperature of the air being recirculated will be raised to the point that motor overheating will occur.

In another approach utilized in prior gasper vent systems, a pressure responsive relief valve is included in the duct to provide an alternate outlet for air flowing in the duct which opens when a predetermined pressure is reached inside the duct. With this approach, even though all of the gasper vents are blocked, a flow of air through the fan is maintained to provide motor cooling. While this approach has been utilized successfully, the inclusion of the valve adds cost and weight and reduces reliability of the gasper vent system.

The instant invention is directed to overcoming one or more of the aforementioned problems and disadvantages.

SUMMARY OF THE INVENTION

It is a primary object of the instant invention, therefore, to provide a new and improved motor driven fan for propelling air along a flowpath which is capable of operating continuously for extended periods with the flowpath completely blocked. It is also an object of the instant invention to provide such a fan in a form suitable for use in an environment such as the gasper vent system of an aircraft. It is further an object of the instant invention to provide such a fan capable of operation in an explosive environment. It is a still further object of the instant invention to provide any additional means, features, or elements required to meet the various objects of the instant invention in a simple form which is readily incorporated into new fan designs and retrofittable into existing fan designs.

An exemplary embodiment of the instant invention achieves the foregoing objects in the form of an electric motor driven fan including a housing defining both a primary passage for directing a primary flow of air from an inlet to an outlet of the fan and a secondary passage for directing a secondary flow of air between the inlet of the fan and ambient air surrounding the housing opposite the primary passage. The secondary passage includes a motor compartment having an inlet passage in fluid communication with the primary passage and an outlet passage in fluid communication with the ambient air surrounding the housing. Impeller means, mounted within the housings, provide the flows of air in the primary and secondary passages. An electric motor, mounted within the motor compartment and operatively connected to drive the impeller means, is continuously cooled by the flow of air through the secondary passage, even when the flow of air through the primary passage is reduced to zero by a complete blockage of the outlet of the fan.

In the exemplary embodiment of the instant invention, the secondary flowpath is provided in a simple effective manner through inclusion in the housing of an inlet orifice and an outlet orifice, with the inlet orifice providing the inlet passage to the motor compartment, and the outlet orifice, in combination with other means within the housing which serve a dual role as a passage for routing lead wires of the motor, providing the outlet passage from the motor compartment.

Other objects and advantages will become apparent from the following specification, taken in connection with the accompanying drawings.

DESCRIPTION OF THE PREFERRED EMBODIMENT

Figure 1:
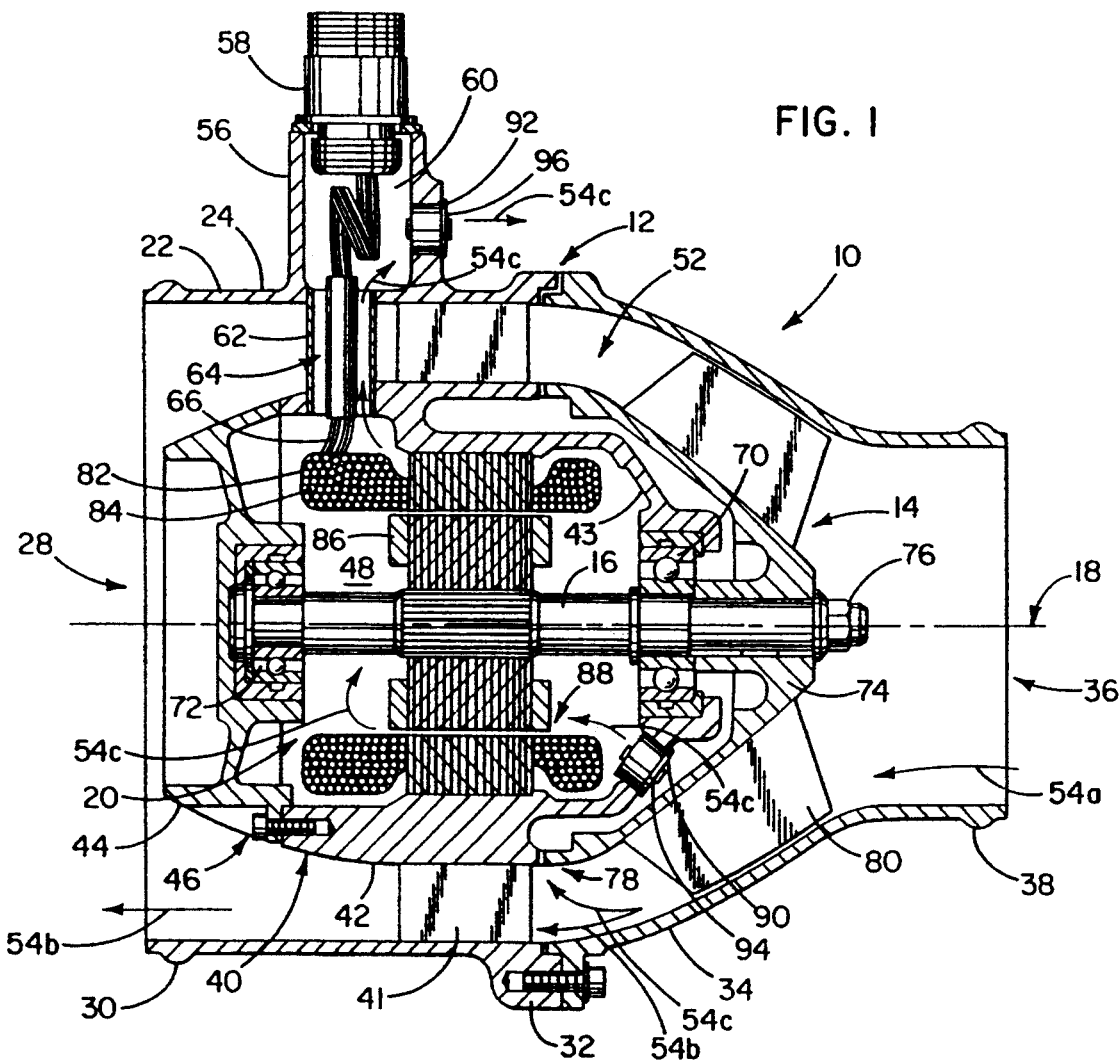
FIG. 1 is a cross-sectional view of an exemplary embodiment of a fan according to the instant invention.

Referring now to FIG. 1, an exemplary embodiment of the instant invention is provided in the form of an electric motor driven fan of the mixed-flow type, generally designated 10. The fan 10 includes a housing, generally designated 12, an impeller 14 fixedly attached to a shaft 16 mounted within the housing 12 for rotation about an axis 18, and an electric motor, generally designated 20, mounted within the housing 12 and operatively connected to the shaft 16 to cause rotation of the combined shaft 16 and impeller 14 about the axis 18 when the motor 20 is connected to a suitable source of electrical power (not shown).

The housing 12 includes a main housing portion 22 having an axially extending annular outer wall 24 defining at a downstream end thereof an outlet of the fan, generally designated 28, having a beaded flange 30 for connection of the fan to, for instance, an outlet duct in an aircraft ventilation system. The outer wall 24 of the main housing 22 includes, at an axially upstream end thereof, an annular flange 32 for attachment of an annular inlet housing 34 which provides a smooth continuation of the outer wall 24 to a point axially upstream from flange 32 whereat an upstream end of the inlet housing 34 defines an inlet, generally designated 36, of the fan 10, having a beaded flange 38 for connection of the fan 10 to, for instance, an inlet duct of an aircraft ventilation system.

The main housing 22 further includes a motor enclosure, generally designated 40, spaced radially inward from and attached to the outer wall 24 by radially extending, axially oriented vanes 41. The motor enclosure 40 includes an axially extending annular side wall 42 disposed about the axis 18 within the housing 12 and spaced radially inward from the outer wall 24. The side wall 42 terminates integrally with a generally radially extending annular end wall 43 at an axially upstream end of the motor enclosure 40. At the downstream end of the motor enclosure 40, the side wall 42 of the motor enclosure 40 is terminated in a second radially extending annular wall in the form of a removable end cap 44. The end cap 44 is attached to the axially extending annular wall by bolts, as indicated at 46, to define a motor compartment, generally designated 48, within the motor enclosure, for receipt of the electric motor 20.

From the foregoing, it will be appreciated that the housing 12, therefore, defines a generally annularly shaped primary passage, generally designated 52, having a radially outward boundary provided by the radially inner surfaces of the outer wall of the main housing 22 and the inlet housing 34, and an inner boundary defined by the motor enclosure 40 for directing a flow of air, generally indicated by arrows 54a, upstream of the impeller 14 and by arrows 54b downstream of the impeller from the inlet 36 to the outlet 28 of the fan 10.

The housing 12 of the exemplary embodiment further includes a radially outward extending cylindrical boss, herein called a connector tower 56, attached to the radially outer surface of the outer wall 24 and having means at the distal end of the connector tower 56 for attachment of an electrical connector 58, with the connector tower 56 and the connector 58 in combination defining a wire space 60 within the connector tower 56. A conduit 62 extends radially through the side wall 42 of the motor enclosure 40, across the primary passage for airflow 52, and through the outer wall 24 of the main housing 22 opposite the connector tower 56 to define a wire passage 64 for routing lead wires 66 of the motor 20 from the motor compartment 48 to the wire space 60 for electrical termination to the electrical connector 58. The conduit 62 thereby protects the lead wires 66 from direct exposure to air 54b flowing within the primary airflow passage 52 and prevents air 54b in the primary passage 52 from entering either the motor compartment 40 or the wire space 60 due to leakage around the lead wires 66.

Bearing means 70, 72 are provided in the end wall 43 and end cap 44 of the motor enclosure 40, respectively, for rotatably mounting the shaft 16 for rotation about the axis 18. The shaft 16 extends through the end wall 43 of the motor enclosure 40 to allow a hub 74 of the impeller 14 to be fixedly attached by a nut 76 to the shaft 16 in close adjacency to end wall 43 of the motor enclosure 40 opposite the motor compartment 48. It will be appreciated that, since the motor enclosure 40 is stationary, a clearance as at 78 must be provided to allow rotation of the impeller 14. Blades 80 extend radially outward from the hub 74 across the primary passage 52 into close proximity with the radially inner surface of the inlet housing 34.

The motor 20 includes a stationary stator 82 disposed about the shaft 16 within the motor compartment 48 and fixedly mounted to the side wall 42 of the motor enclosure 40. Lead wires 66 extending from windings 84 of the stator 82 are routed to and electrically terminated at the connector 58 via the conduit 62 to allow a suitable source of electrical power to be connected to the stator 82.

The motor 20 also includes a rotor 86 fixedly attached to the shaft 16 within the stator 82. It will be appreciated that, in order to allow the rotor 86 to rotate freely within the stator 82 which is stationary, an annular clearance, herein called an air gap and indicated as at 88, must be provided between the rotor 86 and the stator 82.

The motor 20 operates in a conventional fashion converting electrical current received through the lead wires 66 into torque applied to the shaft 16 by the rotor 86 to cause rotation of the shaft 16 when the motor 20 is connected to a suitable source of electrical power.

The end wall 43 of the motor enclosure 40 includes an inlet orifice 90 which provides fluid communication between the primary passage 52 and the motor compartment 48. The connector tower 56 includes an outlet orifice 92 which provides fluid communication between the wire space 60 and ambient air surrounding the housing 12 opposite the primary passage 52. In the exemplary embodiment, flame arresting breather plugs 94 and 96 of the so-called "honey-comb" type, such as those sold under the trade name "Lisk flame arresting honey-comb breather and vent plugs", by the G.W. Lisk Company, are fixedly inserted in the inlet and outlet orifices 90, 92, respectively, to allow safe operation of the fan 10 in an explosive environment.

It will be appreciated that the inlet and outlet orifices 90, 92, in combination with the motor compartment 48, the wire passage 64, and the wire space 60, providing fluid communication between the primary passage 52 and the ambient air surrounding the housing, and in further combination with the primary air passage 52, define a secondary passage providing fluid communication between the inlet 36 of the fan and the ambient air.

In normal operation of the fan 10, as described above, application of electrical current from a suitable power source connected to the connector 58 will cause the impeller 14 to rotate, which in turn causes the blades 80 to force air within the primary passage to move in an axial direction creating a flow of air as indicated by arrows 54a and 54b, with airflow 54b hereinafter referred to as the primary airflow 54b, and creating a plenum condition downstream of the impeller 14, wherein the pressure of the air in the primary passage 52 is higher than the pressure of the ambient air surrounding the housing 12.

As a result of this plenum condition, a secondary airflow, as indicated by arrows 54c, is created within the secondary passage to provide convective cooling for the motor 20.

Specifically, the pressure difference which exists between the primary passage 52 downstream of the impeller 14 and the ambient air causes air entering the inlet 54a and forced by the impeller 14 into the primary passage 52 to split into the primary airflow 54b, and the secondary airflow 54c, with the primary airflow 54b continuing through the primary passage 52 past the motor enclosure 40 and the vanes 41, thereby providing convective cooling of the motor enclosure and vanes in a conventional manner before exiting the fan at the outlet 28. The secondary airflow 54c passes through the clearance 78 between the end wall 43 of the motor enclosure 40 and the hub 74 of the impeller 14 and enters the motor compartment 48 through the inlet breather plug 94 to provide convective cooling of the motor 20 through direct contact with the stator 82 and the rotor 86 prior to exiting the motor compartment 48 through the wire passage 64 within the conduit 62. It will be appreciated that, through judicious placement of the inlet breather plug 94 and the conduit 62 of the exemplary embodiment at opposite axial ends of the motor enclosure 40, the secondary aiflow 54c is caused to pass through the air gap 88 between the rotor 86 and the stator 82 to provide enhanced convective cooling of the motor 20. The secondary airflow 54c then continues from the wire passage 52 into the wire space 60 and exits the housing 12 into the ambient air through outlet plug 96.

It will be appreciated by those skilled in the art that, in comparison to typical prior art motors in which the motor is cooled solely by conductively transferring heat generated in the stator into the motor enclosure 40 and the vanes 41, and then convectively into air flowing within the primary passage 52, the addition of the secondary passage and airflow 54c, according to the instant invention, provides a significant improvement in motor cooling under all operating conditions.

It will also be appreciated that, by virtue of the addition of the secondary passage, the motor 20 will be cooled by the secondary airflow 54c to some degree, even if the primary airflow 54b is lost due to a complete blockage of the outlet 28 of the fan 10. It will further be appreciated that, through judicious design of a fan, according to the instant invention, it is possible to provide a fan with sufficient secondary airflow to allow operation of the fan for extended periods or even indefinitely with the outlet of the fan completely blocked.

The amount of air required for such indefinite operation with the outlet completely blocked has been found to be negligible, on the order of approximately 3 CFM for a fan rated at approximately 600 CFM, for instance, thereby allowing the advantages provided by the instant invention to be utilized with only a negligible loss of primary airflow.

The fan 10 of the exemplary embodiment provides additional advantages and minimizes any negative impact due to incorporation of the secondary flow passage through the utilization of an impeller 14 of the mixed-flow type in which air initially enters the fan in an essentially axial direction and exits the fan in a partly axial partly radial direction. A fan having such a mixed-flow type impeller exhibits a characteristic pressure vs. flow curve which is flat over a significant portion of its operating range. It will be understood by those skilled in the art that the flat pressure vs. flow characteristics provided by a mixed-flow type impeller make such a fan an ideal choice for applications such as a gasper vent system on an aircraft where operation over a wide range of partially restricted and fully blocked primary airflow conditions may be encountered as passengers individually adjust the flow from outlet nozzles above their respective seats during the course of a flight. If a fan exhibiting a steep pressure vs. flow characteristic were utilized in such an application, adjustments or stoppages of airflow by some of the passengers would result in significant increases or decreases in airflow to other passengers during the course of a flight and create a potential source of considerable annoyance for the passengers.

Figure 2:
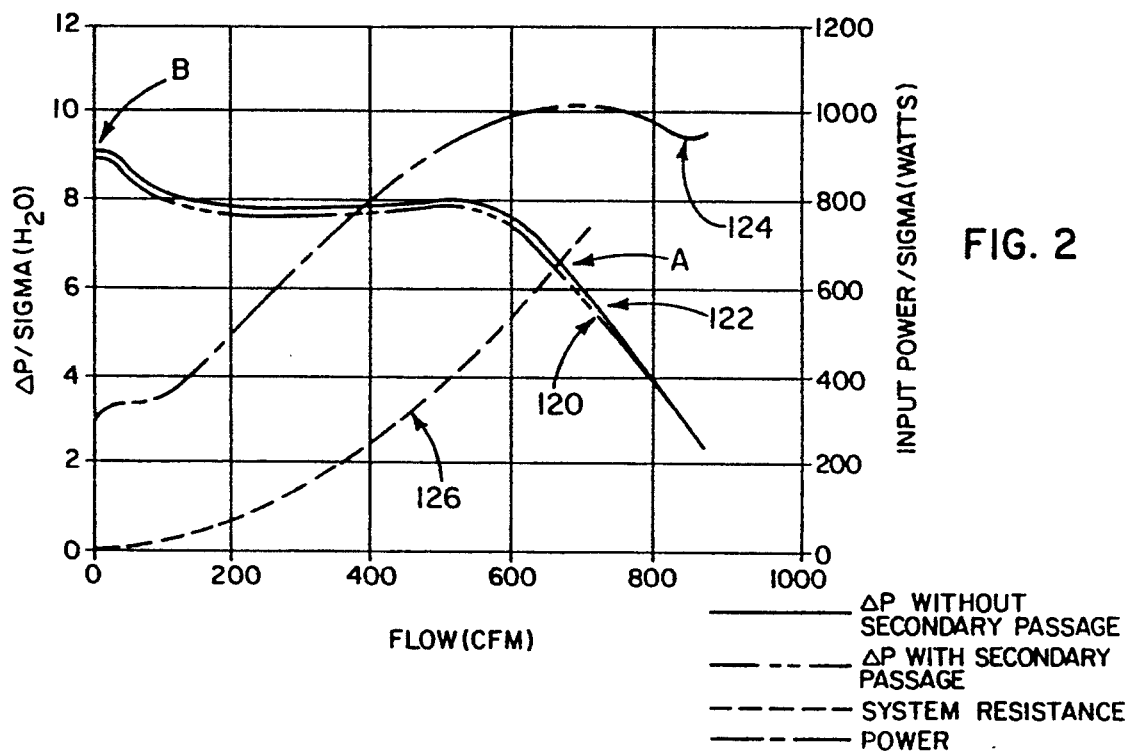
FIG. 2 is a graph depicting representative performance characteristics of a fan according to the instant invention.

Characteristic performance curves are illustrated in FIG. 2 for a typical mixed-flow type fan both with and without the secondary passage of the instant invention. Specifically, curves 120 and 122 of FIG. 2, respectively, illustrate pressure vs. primary airflow characteristics at the outlet of a fan with and without the secondary passage of the instant invention. Curve 124 of FIG. 2 illustrates a power curve which is applicable to both the fan illustrated by curve 120 and the fan illustrated by curve 122. It should be noted that, for purposes of illustration only, the difference in pressure vs. primary airflow characteristics, due to the addition of the secondary passage, has been greatly exaggerated in FIG. 2, with the true difference in flow for a given pressure being negligible, on the order of approximately 3 CFM for a fan rated at approximately 600 CFM, when operating with the outlet completely blocked as previously stated. As seen in FIG. 2, curves 120 and 122 merge at low outlet pressures coincident with essentially free-flow operation of the fan due to the fact that, under such conditions, the pressure differential across the secondary passage is insufficient to generate the secondary airflow.

FIG. 2 also illustrates a typical operating range for primary airflow which might be required in a flowpath, such as an aircraft gasper vent system, between a maximum required flow at a point A, which is defined by the intersection of a flowpath resistance line at a free-flow or totally unblocked condition, as illustrated by curve 126, with either of curves 120, 122 and a minimum required flow at a totally blocked condition as at point B. By comparing curves 120 and 121 of FIG. 2, it is readily seen that, over a significant portion of the operating range between points A and B, virtually the same primary airflow for a given pressure may be had with only a negligible increase in power as illustrated by curve 124 as a result of the flat pressure vs. flow characteristics of the mixed-flow impeller. It is reiterated that, for purposes of illustration only, the difference in pressure vs. primary airflow characteristics has been greatly exaggerated in FIG. 2 such that the actual increase in power required to obtain equivalent primary airflow in a fan having a secondary passage according to the instant invention has been found to be negligible, even though the power curve 124 exhibits a fairly steep slope over much of the operating range.

For systems in which a fan must operate with a complete blockage of primary flow, the choice of a mixed-flow impeller, as in the exemplary embodiment, provides still further advantage due to the relative absence, in comparison to fans having other types of impellers, of vibration and noise inducing surge inherent in the operation of a fan having a mixed-flow impeller under conditions where the primary airflow is reduced to zero. It is also noted that the addition of the secondary passage of the instant invention will further enhance this capability, in that, due to the secondary airflow, the impeller of a fan constructed according to the instant invention will never truly operate in a completely stalled mode.

In summary, it will be appreciated by those skilled in the art that, through incorporation of the various elements and features comprising the instant invention, a motor driven fan capable of operating continuously with a complete blockage of airflow, and providing numerous other advantages, as described hereinbefore, has been provided. It will be further appreciated by those skilled in the art with reference to the exemplary embodiment that the secondary passage for airflow may be readily retrofitted into existing fans with only minor modifications.

Specifically, in comparison to prior art fan or vent systems in which a recirculation duct is utilized, the instant invention provides improvement in that, by virtue of the addition of the secondary flow passage, new air continually enters the fan inlet even when airflow through the primary passage is entirely blocked, thereby allowing the fan of the instant invention to be operated indefinitely without danger that the temperature of the air used for motor cooling will eventually be raised to a point where motor overheating will occur.

In comparison to prior art fans which relied on the inclusion of a relief valve in the flowpath to provide a continuous flow of air for motor cooling, the instant invention provides significant improvement in the form of reductions in system complexity, volume, weight, and cost, with improved reliability by allowing elimination of the relief valve.

Although the instant invention has been illustrated and described in conjunction with particular embodiments thereof, it will be apparent to those skilled in the art that other combinations, modifications, and uses of the various features of the instant invention may be devised without departing from the spirit of the invention as set forth in the appended claims.

I claim:

1. A fan comprising:
   a housing including,
      an outer wall defining an inlet and an outlet of the fan, and a primary passage providing fluid communication between the inlet to the outlet;
   a motor enclosure disposed within the primary passage and defining a motor compartment, said motor enclosure further including a port extending through the motor enclosure and providing fluid communication between the primary passage and the motor compartment,
   a conduit connecting the motor enclosure to the outer wall, and providing fluid communication between the motor compartment and ambient air surrounding the outer wall of the housing opposite the primary passage,
   said port and conduit in combination with the motor enclosure thereby defining a secondary passage providing fluid communication between the primary passage and the ambient air surrounding the outer wall of the housing;
   a fan impeller for creating a flow of air from the inlet through the primary passage to the outlet, and from the inlet through the primary and secondary passages in combination to the ambient air surrounding the outer wall of the housing; and
   a motor mounted within the motor compartment and operatively connected to drive the fan impeller;
   said secondary passage thereby allowing said impeller to provide a flow of air for cooling said motor should the flow of air through the primary passage become blocked or restricted.

2. The fan of claim 1 further including flame arresting means within the secondary passage.

3. The fan of claim 1 wherein the impeller means is a fan wheel having a hub mounted for rotation about an axis and blades attached to the hub for creating said flows of air.

4. The fan of claim 3 wherein the fan wheel is a mixed-flow impeller.

5. The fan of claim 1 wherein the motor is an electric motor.

6. The fan of claim 6 wherein the electric motor includes lead wires extending from the motor.

7. The fan of claim 6 wherein the lead wires of the electric motor are routed through the secondary passage.

8. The fan of claim 1 wherein the outlet includes means for attaching the fan to a gasper vent system.

9. A fan comprising:
   a housing including,
      an outer wall defining an inlet and an outlet of the fan, and a primary passage providing fluid communication between the inlet to the outlet;
   a motor enclosure disposed within the primary passage and defining a motor compartment, said motor enclosure further including a port extending through the motor enclosure and providing fluid communication between the primary passage and the motor compartment,
   a conduit connecting the motor enclosure to the outer wall and providing fluid communication between the motor compartment and ambient air surrounding the outer wall of the housing opposite the primary passage,
   said port and conduit in combination with the motor enclosure and the primary passage thereby defining a secondary passage providing fluid communication between the inlet of the fan and the ambient air surrounding the outer wall of the housing;
   a motor mounted within the motor compartment, the motor having a shaft rotatable about an axis and having a distal end extending through the motor enclosure into the primary passage; and
   a fan wheel having a hub driveably attached to the distal end of the shaft for rotation about the axis and further having blades attached to the hub for creating a flow of air from the inlet through the primary passage to the outlet and from the inlet through the secondary passage to the ambient air surrounding the outer wall of the housing.

10. The fan of claim 9 further including flame arresting means within the secondary passage.

11. The fan of claim 9 wherein the motor is an electric motor including lead wires extending from the motor.

12. The fan of claim 11 wherein the lead wires are routed through the conduit.

13. The fan of claim 11 wherein the conduit extends beyond the outer wall opposite to the primary passage to form a connector tower for mounting thereupon an electrical connector for terminating the lead wires of the motor.

14. The fan of claim 9 wherein the fan wheel is a mixed-flow type impeller.

15. The fan of claim 10 wherein the outlet includes means for attaching the fan to a gasper vent system.

16. A gasper vent system having a gasper boost fan for providing a flow of air in the gasper vent system, that gasper boost fan comprising:
- a housing including,
    - an outer wall defining an inlet and an outlet of the fan, and a primary passage providing fluid communication between the inlet to the outlet, with said outlet including means for attaching the fan to the gasper vent system;
    - a motor enclosure disposed within the primary passage and defining a motor compartment, said motor enclosure further including a port extending through the motor enclosure and providing fluid communication between the primary passage and the motor compartment,
    - a conduit connecting the motor enclosure to the outer wall, and providing fluid communication between the motor compartment and ambient air surrounding the outer wall of the housing opposite the primary passage,
    - said port and conduit in combination with the motor enclosure thereby defining a secondary passage providing fluid communication between the primary passage and the ambient air surrounding the outer wall of the housing;
- a fan impeller for creating a flow of air from the inlet through the primary passage to the outlet, and from the inlet through the primary and secondary passages in combination to the ambient air surrounding the outer wall of the housing; and
- a motor mounted within the motor compartment and operatively connected to drive the fan impeller;
- said secondary passage thereby allowing said impeller to provide a flow of air for cooling said motor should the flow of air through the primary passage or the gasper vent system become blocked or restricted.

* * * * *